UNITED STATES PATENT OFFICE.

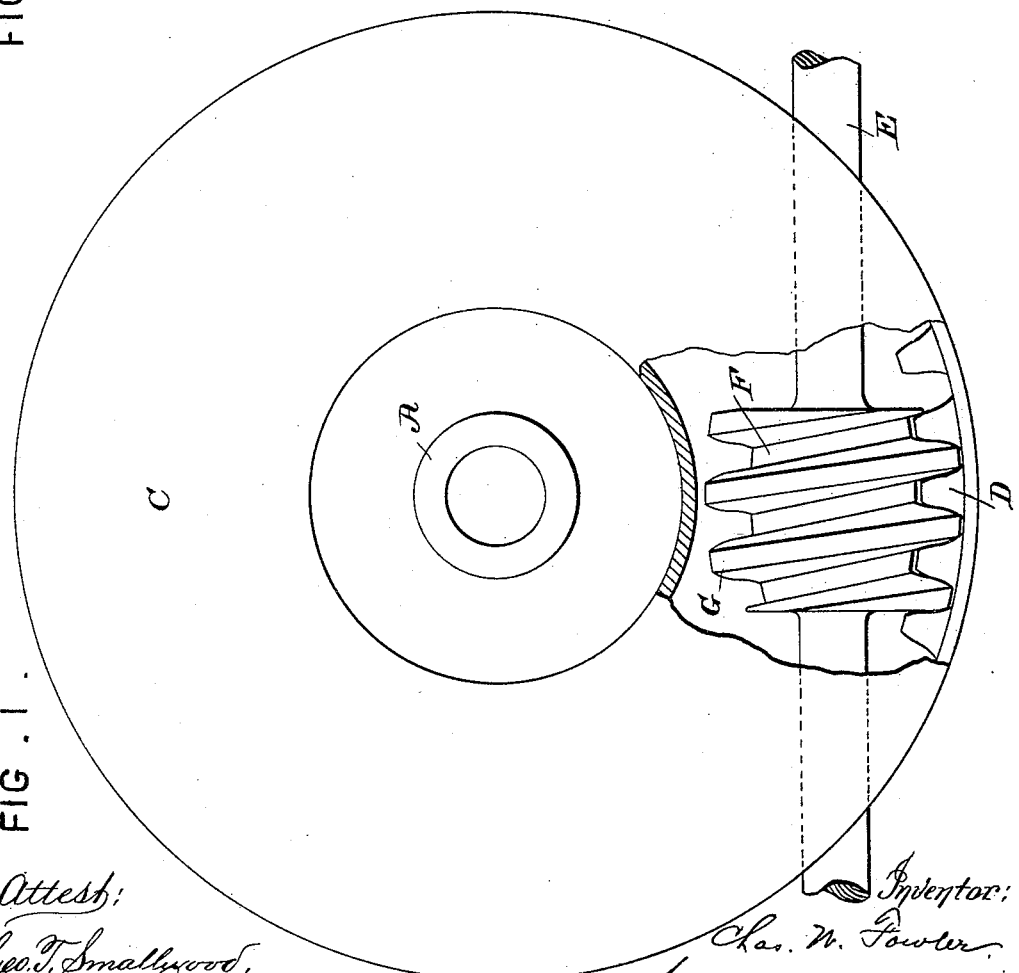

CHARLES W. FOWLER, OF BALTIMORE, MARYLAND.

WORM-GEARING.

SPECIFICATION forming part of Letters Patent No. 493,493, dated March 14, 1893.

Application filed May 20, 1892. Serial No. 433,718. (No model.)

*To all whom it may concern:*

Be it known that I, CHARLES W. FOWLER, of Baltimore, Maryland, have invented a new and useful Improvement in Worm-Gearings, which is fully set forth in the following specification.

This invention has relation to the construction of worm-gearing, and has for its object to overcome the disadvantages attending the use of such gearing for transmitting power, and to facilitate the construction of the worm and worm-wheel.

In the use of worm-gearing of ordinary construction the contact between the worm and worm-wheel is confined to a small area, and consequently there is upon this surface of the thread and teeth, excessive wear, friction and strain. The worm being arranged tangentially to the worm-wheel, only one thread of the former is in full engagement with a tooth of the latter. According to the present invention the teeth of the worm-wheel are placed inside of the rim, instead of outside, and the worm in engagement therewith is between the periphery of the wheel and its center, thus producing what may be termed an "internal worm."

The principle of the invention may be variously applied, but I will describe herein that form which is regarded as the best embodiment of my invention. The worm-wheel has a hollow annular rim and is cast in two halves, the plane of division passing entirely through the wheel at right angles to its axis of revolution. The outer edges of the two parts of the annular rim do not come together, but between them is an opening or slot extending entirely around the rim, through which opening or slot passes the shaft of the worm. The teeth are formed on the inside of the hollow rim. The worm is cut upon a hub of spindle shape, formed by the revolution of a circular arc about its chord. As the circle of this arc is of the same diameter as the worm-wheel, the surface of the worm and gear are in the same plane, and all the threads of the worm are fully engaged. The thread circles the hub in such a manner that at any point thereof a line drawn through the center of the thread, if prolonged, would intersect the radius of the circular arc of the worm spindle at the center of the circle.

The invention and the preferred mode of applying the principle thereof, will be better understood from the following description, in which reference is made to the accompanying drawings, whereof—

Figure I, is a side view, the rim of the wheel being partly broken away, and Fig. II is a vertical section.

The worm-wheel is composed of two like parts, the plane of division passing centrally through the hub A, web B and hollow rim C. The latter is annular in form, and its internal space is of sufficient size to contain the worm, which is entirely inclosed. The rim C has an opening or slot $c$, through which the worm shaft E, passes. The teeth D of the worm are formed on the inside of the hollow rim C, and as shown they extend from the edge of slot $c$ part way round the rim. They may extend a greater or less distance around the rim, and as will be seen, they are in contact with the worm threads as far as they (the teeth) extend. In ordinary worm-gearing the threads and teeth diverge from each side of a central point. The hub F of the worm is in the form of a spindle, produced by the revolution of a circular arc about its chord, the circle being of the radius of the worm-wheel measured from the center to the outer faces of teeth D. A cross-section of the hub, is of substantially the same diameter as the circle of which the outer faces of teeth D represent arcs. The threads G of the worm conform in shape with the spaces between the teeth D, and a line connecting the summits of the threads G will (as clearly shown in Fig. I) be a circular arc, the radius of the circle being from the center of the worm wheel to the bottom of a space between the teeth D.

The advantages of the invention are chiefly that there is greater contact surface and a greater number of teeth in full engagement to sustain the load, and that the pressure on the surfaces in contact is direct, being always in a line perpendicular to a radius of the gear. Furthermore, the wear in ordinary worm-gearing is mainly on the thread of the worm intersected by a radius of the worm-wheel when prolonged, and it is difficult to compensate for such wear. In the described internal worm-gearing, there is an equal distribution of wear, and consequently much greater endurance without necessity of adjustment, and when necessary, wear can be taken up by simply moving the worm-shaft a little farther from the axis of the wheel.

Other minor advantages might be pointed out, as for instance, the gearing being inclosed is protected from injury, and from foreign matters lodging between the teeth, and there is small likelihood of accident to the fingers or clothing of persons employed about the machinery where this gearing is used.

What I claim as my invention is—

1. A worm-gearing comprising a driving shaft having a worm thereon, and a worm-wheel having a rim partly surrounding the said shaft and worm, the teeth engaging the worm being formed on the inner face of the rim, and the said driving shaft projecting beyond the circumference of the worm-wheel, substantially as described.

2. A worm-gear comprising a worm-wheel having a hollow rim formed with an annular slot therein, the teeth being on the inside of said hollow rim, a shaft passing through said slot and a worm on the shaft engaging the teeth, substantially as described.

3. A worm gear comprising a worm-wheel having a hollow rim, and composed of two like parts the plane of division passing centrally through the hub, web and rim, and having also an annular slot formed between the outer edges of the two parts, the teeth being on the inner face of the hollow rim on each side of the slot, a shaft passing through said slot, between the two parts of the worm-wheel and a worm on said shaft engaging the teeth in the hollow rim, substantially as described.

4. The combination with a worm wheel having a rim provided with teeth on the inside or side toward the center of the wheel, of a shaft carrying a hub of spindle shape, and threads on the hub engaging the said teeth, substantially as described.

5. The combination with a worm-wheel having a rim provided with teeth on the inside, or side toward the center of the wheel, of a shaft carrying a hub of spindle shape, and threads on said hub diminishing in diameter toward the ends of the same, substantially as described.

In testimony whereof I have signed this specification in the presence of two subscribing witnesses.

CHARLES W. FOWLER.

Witnesses:
PHILIP MAURO,
REVE LEWIS.